May 29, 1945.   J. T. BRUBAKER   2,377,069
MEAT GRINDING AND CONDIMENT ADMIXING MACHINE
Filed June 14, 1941   2 Sheets-Sheet 1
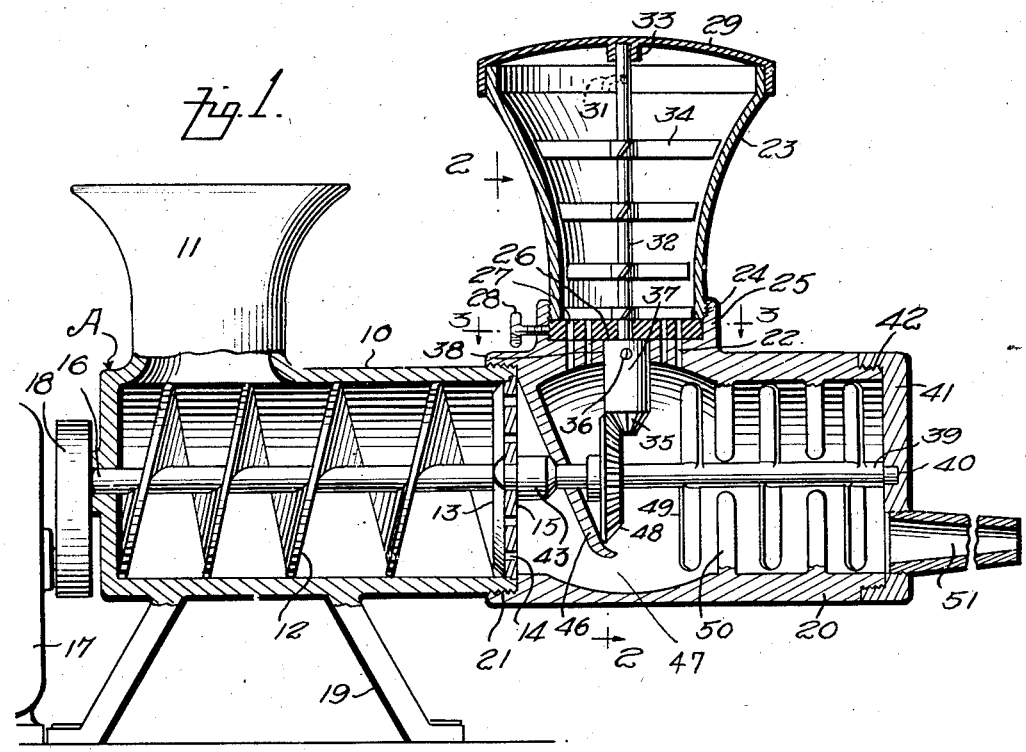
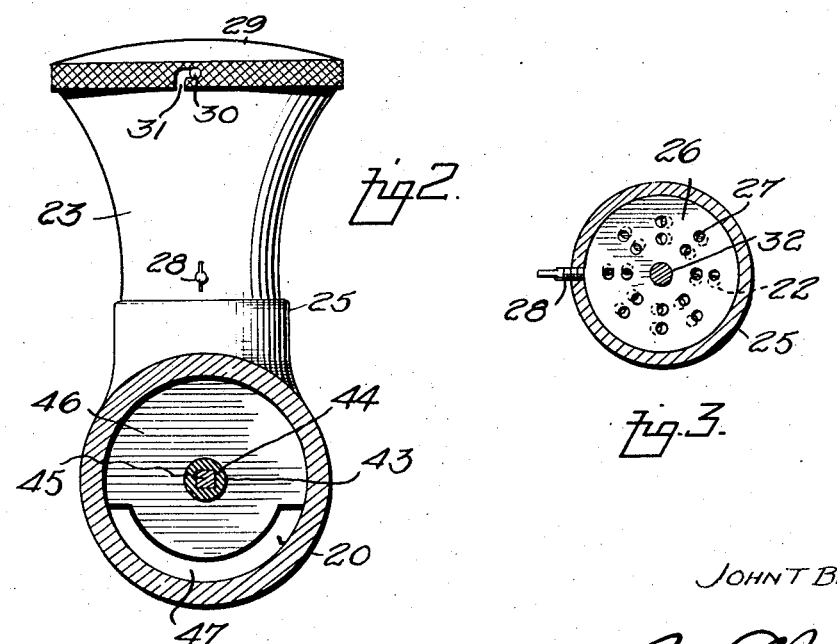
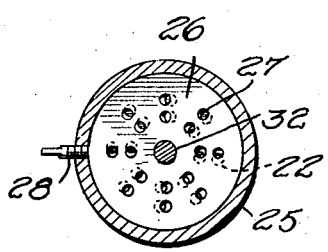
Inventor,
JOHN T BRUBAKER,
By
Attorney.

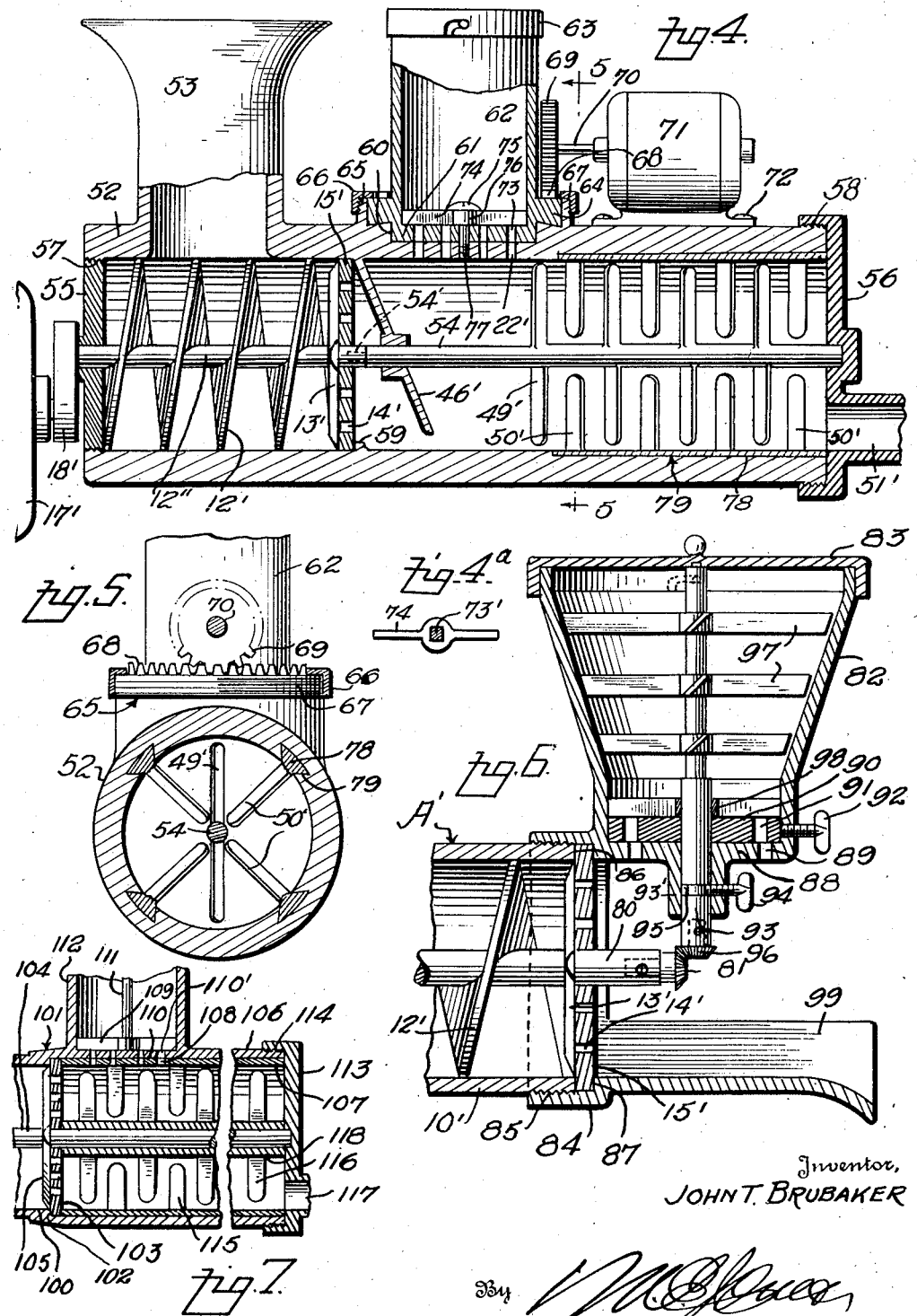

Patented May 29, 1945

2,377,069

UNITED STATES PATENT OFFICE 2,377,069

MEAT GRINDING AND CONDIMENT ADMIXING MACHINE

John T. Brubaker, Luray, Va.

Application June 14, 1941, Serial No. 398,134

11 Claims. (Cl. 146—182)

This invention relates to a mechanism whereby condiment or seasoning materials such as salt and pepper, may be added to and admixed with ground meat in such manner as to avoid contact of the human hands therewith, especially in the stuffing of sausage, thereby effecting the mixture in a more sanitary and expeditious manner.

One important object is to provide a structure wherein the condiment or seasoning materials are added after grinding of the meat but before discharge from the machine.

Another object is to effect the dispensing of the condiment or seasoning materials through operation from or in unison with the operation of the shaft of a meat grinder.

A third object is to provide a construction which may be built into a meat grinding machine initially or which is capable of manufacture as an attachment or addition to a conventional meat grinding machine.

A fourth object is to embody the invention in the form of a meat grinder and mixer, with condiment feeding means operable through the same source of power as the grinder or from a different source of power, and in the latter instance, preferably, mounted on the mixer.

A further object is to provide a construction or machine which may be initially embodied in meat grinding machines, with the latter constituting a meat grinder and mixer and having a casing common to them and usually manufactured in one piece.

Various additional objects and advantages will become apparent from a consideration of the description following, taken in connection with the accompanying drawings, and showing examples of operative embodiments.

In said drawings:

Figure 1 is a view illustrating the invention as an attachment for a meat grinder, the parts being approximately in central, longitudinal, vertical section;

Figure 2 is a vertical section taken on the line 2—2 of Figure 1;

Figure 3 is a horizontal section taken on the line 3—3 of Figure 1;

Figure 4 is an approximately central, vertical, longitudinal section taken through the second form of the invention;

Figure 4ª is a detail partly in plan and partly in section of the scraper bar and its fastening;

Figure 5 is a vertical section taken approximately on the line 5—5 of Figure 4;

Figure 6 is an approximately central, vertical, longitudinal section through the third form of the invention; and Figure 7 is a fragmentary central, vertical, longitudinal section through a fourth form of the invention.

Referring specifically to the drawings, wherein like reference characters designate like or similar parts, and first to the form of Figures 1 to 3, a conventional meat grinding machine is shown at A and may consist of a casing 10, to which meat to be ground is supplied through a hopper 11. A feed screw or worm 12 is disposed within the casing 10 to propel the meat to the right in Figure 1 for coaction with a cutter or knife 13 and passage through perforations 14 of a plate 15. The screw 12 has a rotatable shaft 16 journaled in the casing and plate 15, to which the knife 13 is detachably connected. Such shaft 16 may be operated manually or by power, as preferred. As shown, said shaft 16 is driven from a conventional electric motor 17, through the medium of intermediate gearing at 18. Casing 10 may be secured to any suitable support through the medium of legs at 19.

To accomplish the objects of my invention, I provide a mixer casing at 20 which has internal screw threads at one end detachably engaged at 21 with screw threads of the grinder casing 10 and which are those usually engaged by a ring to hold the plate 15 in position. However, in this instance, it will be noted that the casing 20 overlaps the plate 15 and accordingly holds the same in operative position.

In a portion of the wall of the casing 20 at the top thereof, perforations 22 of any desired size, number and arrangement are provided through which condiment or seasoning materials, such as salt, pepper, mustard, or the like, are adapted to pass from a suitable hopper 23. Said hopper 23 is of any desired capacity and shape and, as shown, flares upwardly. At the lower portion, said hopper 23 has screw threads which detachably engage screw threads at 24 internally of a collar 25 formed integral with the casing 20 and surrounding that portion of the casing 20 containing the perforations or passages 22. A disk 26 is seated within the collar 25 and has openings or passages 27 arranged like those at 22. Said disk 26 is held in place by a binding screw 28 which is threaded through the collar 25 and engages the periphery of the disk. Such disk 26 is loose when disengaged by the screw 28 and, hence, the same may be adjusted to cause full or partial registration of the passages 22 and 27, according to the rate at which the feed of condiment into the mixer casing 20 is desired. When the disk 26 is loose, adjustment will be effected by engagement of any instrument inserted through the top of the hopper 23 and engaged with any opening 27. Said disk 26 is also clamped or fastened in place by the lower edge of hopper 23.

Hopper 23 is covered by a detachable closure 29, which may be held against accidental displacement by any suitable joint, such as screw threads or the pin and bayonet slot at 30 and 31, respectively, on the hopper and closure. Any suitable agitator is adapted to operate within hopper 23, and one type consists of a vertical shaft 32 which is journaled in the disk 26 and whose upper end is removably seated in a socket or bearing 33 depending from the closure 29. Agitator arms 34 radiate from the shaft 32.

Said shaft 32 below the disk 26 has a gear wheel 35 detachably connected thereto, as by means of a screw at 36, and which gear wheel has a vertically extended smooth cylindrical portion 37 journaled in an opening 38 centrally of the collar 25.

Disposed within the mixer casing 20 and in alignment with the screw shaft 16, is a feed shaft 39, the same at one end being reduced and journaled in a socket 40 in a detachable end plate 41, screw threaded or otherwise connected at 42 to the mixer casing 20. At the other end, shaft 39 has an enlarged portion 43 containing a squared or other non-circular socket 44, which detachably slides over and engages a squared end portion 45 on the shaft 16. It will be noted that shaft 39 is also journaled in a guide wall 46 integral with the mixer casing 20 and, preferably, inclining downwardly and forwardly from the top thereof, leaving a restricted arcuate space 47 between its lower edge and the inner wall of mixer casing 20, thereby causing meat extruded through the perforations 14 to pass through the slot or space 47. A gear wheel 48 is detachably carried by the shaft 39 and is enmeshed with the gear 35. The feed shaft 39 is provided with any suitable feeding means, such as flights 49. The latter alternate with feed flights 50, which extend inwardly and integrally from the wall of mixer casing 20. Such flights 49 and 50 coact to feed the material to and through a sausage stuffer nozzle 51 to the sausage links.

In the operation of the machine, the meat supplied through the hopper 11 is ground in the casing 10 in the usual manner through the coaction of the worm 12, and cutter 13, emerging through the openings 14 into the mixer casing 20, passing through the slot 47 and thus in minimum contact with or interference with the gears 35 and 48. At the same time, the grinder shaft 16 rotates the mixer shaft 39 and the gears rotate the agitator shaft 32 so that the arms 34 agitate the condiment or seasoning in hopper 23 insuring the feed or flow thereof in the desired quantity through the passages or openings 27 and 22 into the mixer casing 20, which condiment or seasoning is admixed with the ground meat and fed forward through the action of the flights 49 and 50, and being delivered to the sausage links through the stuffer nozzle 51.

It will be realized that the condiment or seasoning supply means is operated by the same source of power as the meat grinder A, and that the shaft of the latter drives the shaft of the former. It will also be clear that my improvements in this form constitute an attachment or addition for the conventional meat grinding machine, since the connection may be effected at the screw threads 21 and the drive effected at 44 and 45.

Various changes may be resorted to within the spirit and scope of the invention, and, for instance, I may practice the invention in the form shown in Figure 4 where the grinder casing and mixer casing are integral and constitute a single element as initially built. In this form, the casing is designated 52, having a hopper 53 for supply of meat into the same. Aligned screw and mixer shafts 12'' and 54 are detachably coupled together at 54' and disposed within casing 52 and respectively journaled at their outer ends in removable closure plates 55 and 56, detachably secured in place by suitable joints, such as screw threads 57 and 58, respectively. Shafts 12'' and 54 may be driven manually or by power and, for instance, by means of an electric motor 17' and conventional gearing 18', connected directly to shaft 12'' and corresponding to the drive at 17 and 18 in Figure 1.

The meat in casing 52 is first fed by a screw 12' of which said shaft 12'' is a part to and past a cutter or knife 13' positioned thereon, and thence through openings 14' of a stationary but removable plate 15' which is positioned by a ridge 59 and a shield or deflector plate 46' integral with the casing 52. Plate 46' functions like that at 46 in the preceding form. The inner ends of shafts 12'' and 54 are respectively journaled in said plates 15' and 46'.

In the upper portion of casing 52, forwardly of the deflector plate 46', passages or openings 22', functioning like those at 22, are provided. Said openings 22' are in an area above which a depression or well 60 is provided, in which a base plate 61 is rotatably fitted or journaled. Said base plate 61 is part of a hopper 62, which may be cylindrical, as shown, flared like that at 23 or otherwise shaped. It has a removable closure 63 thereon. An annular rack or rib 64 extends outwardly from the hopper 62 adjacent the base and it is surrounded by a collar or ring 65 integral with casing 52. A ring nut 66 is screw threaded at 67 to the collar 65 and it overlaps the rack or flange 64 so as to detachably secure the condiment hopper 62 in place.

Said rack 64 has an angular row of gear teeth 68 which are enmeshed with a gear wheel 69 carried by a shaft 70 and operated from any suitable source of power, preferably, an electric motor 71, screwed or otherwise fastened, as at 72, to the casing 52 and thereby supported by the latter.

Any suitable propulsion and mixing means may be provided in the casing 52 forwardly of the shield 46' and, for instance, may consist of coacting flights at 49' and 50', respectively, carried by shaft 54 and casing 52, and functioning like those at 49 and 50 in the preceding form, to deliver the mixed meat and condiment through a stuffer nozzle 51' on the end plate 56, to sausage links.

It will be realized that the shafts 12'', 54 and 70 may be driven in properly timed relationship so that meat ground by knife 13', passing through openings 14' and beneath shield 46' into the mixing chamber, will receive condiment as a result of the rotation of the hopper 62 and passage of condiment through openings 22' and openings 73 provided in the plate 61 and adapted to register therewith. A scraper bar 74 is removably fastened in a stationary position across the plate 61 and within hopper 62 by a removable screw 75 having a squared portion 73' fitting a corresponding portion 76 of the scraper bar, which screw is screw threaded at 77 to casing 52. Plate 61 rotates on the smooth cylindrical portion of the screw 75. It will be realized that the condiment is added to the ground meat forwardly of the deflector plate 46 and that thereafter the meat and condiment are effectively mixed through the coaction of the flights 49' and 50'.

Attention is called to the fact that in this form of the invention, the flights 50' may be formed integral with bars 78, shaped to intimately fit undercut recesses 79 in the bore wall of casing 52, the bars 78 being slidable into and out of place and retained in position by the closure 56.

In Figure 6, a third form of the invention is disclosed, wherein but a fragment of a meat grinder is disclosed at A' and which is conventional and may be like that disclosed at A. Accordingly, a casing 10', screw 12', knife 13', perforations 14' and plates 15' correspond to and function like the parts at 10, 12, 13, 14 and 15, respectively. The shaft of the worm 12', designated 80, is extended outwardly beyond the detachable perforated plate 15' and carries a gearwheel 81, suitably detachably connected to said shaft.

A hopper for condiment or seasoning material is provided at 82, having a suitable movable closure 83 thereon, the hopper being of any desired shape.

Integral with the main wall of the hopper 82, disposed at one side thereof, is an attaching ring 84, which is provided with any suitable means whereby a machine connection is made with the casing 10'. Preferably, such ring 84 has internal screw threads at 85, detachably engaging those of the casing, as in Figure 1. Ring 84 is so constructed that adjacent portions of the unit will have shoulders at 86 and 87 in clamping and retaining engagement with the fixed perforated plate 15'.

Said hopper 82 has an integral bottom or base wall 88 provided with discharge openings or passages 89 for the condiment or seasoning. Resting on the wall 88 and rotatably adjustable relatively thereto is a regulating disk 90 having openings or passages 91 adapted to fully or partially register with the openings 89. Disk 90 is rotatably adjustable like that at 26 and for the same purpose, and it is normally held against movement through the binding action of a screw 92, engaging its periphery and threaded in the wall of the hopper 82.

A vertical agitator shaft 93 is centrally disposed in hopper 82 being journaled in a depending bearing 93' of the latter and in the plate 90, a screw 94 aiding in the positioning thereof since it is threaded in the bearing 93' and has an inner end extended into an annular groove 95 provided about the shaft 93. Shaft 93, at its lower end, is provided with a removable gear-wheel 96 enmeshed with that at 81, and the shaft is further provided with radiating agitator arms 97 within the hopper.

It will be realized that the shaft 80, whether operated manually or by power, also drives or operates the agitator shaft 93 in such timed relation as to dispense condiment or seasoning onto ground meat exuding or discharging through the perforations 14'. A scraper 98 is carried by shaft 93 and operates across the top of the regulating disk 90. Also, a support or shelf 99 of any desired shape and extent is formed integrally with the ring 84 and hopper 82 and extends forwardly with respect to the perforated plate 15' and directly under the perforated plate 88, so as to hold and support the meat at the interval that it receives the condiment or seasoning, it being clear that the meat thus seasoned will fall from the forward or free end of the shelf 99 into a suitable receptacle.

In Figure 7, another variation of the invention is disclosed. Here, the condiment hopper 112 may be cast integral with a casing 101, a part 100 of which serves as a meat grinder casing and has an internal shoulder at 102 against which a removable stationary perforated plate at 103, functioning like that at 15, is disposed. A shaft 104 is rotatably mounted centrally of the casing 101 and at the left hand end is adapted to carry a feed worm such as 12' and a cutter 105. Such shaft 104 corresponds to the aligned detachably coupled shafts 12'' and 54 and may be manually or power driven in the same manner. The casing section 100 is provided with the hopper 112 and removable end plate 113.

A portion 106 of casing 101 serves as a mixer casing and therein a liner or cylinder 107 is removably disposed and adjustable to cause full or partial registration between condiment discharge ports or passages 108 thereof and holes or passages 110' in the base wall 110 of hopper 112 through which condiment is adapted to pass or to be dispensed for admixture with ground meat entering the cylinder 107 through perforated plate 103. The condiment hopper 112 may be of any desired form but, preferably, has a rotatable agitator shaft 111 and a scraper 109 thereon movable over the wall 110.

A removable end plate or closure 113 is screw threaded or otherwise detachably connected at 114 to the casing section 106. Fights 115 and 116 coact to admix the condiment and meat and feed it through a sausage stuffer nozzle 117. The flights 115 are carried by a liner or cylinder 107 while the flights 116 are carried by a sleeve 118, removably telescoped over but rotatable with shaft 104. The shafts 104 and 111 may be driven in such timed relationship that the proper amount of condiment is supplied to the ground meat entering the mixing chamber and which is admixed therewith in such chamber and fed to the sausage links through the stuffer nozzle 117.

I claim as my invention:

1. In combination, a mixing casing to receive ground meat, feed means therein, means to sprinkle condiment into said casing onto ground meat, and agitator means for the condiment geared within said casing to said feed means.

2. In combination, means to receive ground meat, means to sprinkle condiment, and mechanisms operable in timed relation to supply ground meat to the first means and to operate the second means to supply condiment onto the ground meat in said first means.

3. In combination, a mixing casing, a conveying means therein including a shaft, means to feed ground meat into said mixing casing, means to sprinkle condiment into the casing onto ground meat geared within the casing to said shaft, and means in the casing to deflect ground meat away from the zone of gearing and so that the ground meat is in a relatively wide stream when sprinkled.

4. In combination, a mixing casing, a conveying means therein including a shaft, means to feed ground meat into said mixing casing, means to sprinkle condiment into the casing onto ground meat geared within the casing to said shaft, and a wall on the casing in which said shaft is journaled and disposed to deflect ground meat away from the zone of gearing and so that the ground meat is in a relatively wide stream when sprinkled.

5. In combination with a meat grinder, a casing to receive ground meat therefrom, feed means for the meat in the casing driven from the grinder, means whereby condiment is sprinkled onto the ground meat in the casing, and means to deflect ground meat passing through the casing so that the ground meat is in a relatively wide stream when sprinkled.

6. In combination with a meat grinder, a casing thereon to receive ground meat therefrom, feed means in the casing driven by the grinder, means carried by the casing to sprinkle condiment onto ground meat, agitator means for the condiment supply means, and gearing within the casing to drive the agitator means from said feed means.

7. In combination with a meat grinder, a casing thereon to receive ground meat therefrom, feed means in the casing driven by the grinder, means carried by the casing to sprinkle condiment onto ground meat, agitator means for the condiment supply means, gearing within the casing to drive the agitator means from said feed means, said condiment supply means comprising a hopper, and means mounting the hopper on the casing, said casing having perforations through the wall thereof communicating with the hopper to sprinkle condiment to the interior thereof.

8. In combination with a meat grinder, a casing thereon to receive ground meat therefrom, feed means in the casing driven by the grinder, condiment supply means carried by the casing, agitator means for the condiment supply means, gearing within the casing to drive the agitator means from said fed means, said condiment supply means comprising a hopper, means mounting the hopper on the casing, said casing having perforations through the wall thereof communicating with the hopper to supply condiment to the interior thereof consisting of a disk having perforations to overlap and align with the first mentioned perforations, the last mentioned means being a collar within which said disk is disposed, said collar having screw threads engaged by screw threads on the hopper.

9. In combination with a meat grinder, a casing thereon to receive ground meat therefrom, feed means in the casing driven by the grinder, condiment supply means carried by the casing, agitator means for the condiment supply means, gearing within the casing to drive the agitator means from said feed means, said condiment supply means comprising a hopper, means mounting the hopper on the casing, said casing having perforations through the wall thereof communicating with the hopper to supply condiment to the interior thereof consisting of a disk having perforations to overlap and align with the first mentioned perforations, the last mentioned means being a collar within which said disk is disposed, said collar having screwthreads engaged by screw threads on the hopper, and a wall interiorly of the casing integral therewith, through which said shaft passes as a bearing positioned to deflect meat away from the zone of gearing.

10. A machine of the class described having a casing, means therein to grind meat, said casing having passages extending through its wall, condiment sprinkling means mounted on said wall in communication with said passages and including a rotatable part so that condiment may be supplied to ground meat within the casing while the meat is in motion imparted by the grinding to insure dispersion in the ground meat, means mounted on said casing to operate the condiment sprinkling means geared to said rotatable part, and means within the casing to mix and feed the meat and condiment.

11. A machine of the class described having a casing, means therein to grind meat, said casing having passages extending through its wall, condiment sprinkling means mounted on said wall in communication with said passages so that condiment may be supplied to ground meat within the casing, means mounted on said casing to operate the condiment supply means, means within the casing to mix and feed the meat and condiment, said casing having a well, the condiment supply means being a hopper extending into said well, an annular gear member extending laterally from the well, a collar within which the gear member is fitted, retaining means overlapping the gear member and fastened to said collar, and a gear enmeshed with the gear member, and means mounted on the exterior of the casing to drive the gear member.

JOHN T. BRUBAKER.